(12) United States Patent
Nakashima

(10) Patent No.: US 10,346,970 B2
(45) Date of Patent: Jul. 9, 2019

(54) INSPECTION METHOD FOR DETECTING A DIE DEFECT

(71) Applicant: NuFlare Technology, Inc., Yokohama-shi (JP)

(72) Inventor: Kazuhiro Nakashima, Kawasaki (JP)

(73) Assignee: NuFlare Technology, Inc., Yokohama-shi (JP)

( * ) Notice: Subject to any disclaimer, the term of this patent is extended or adjusted under 35 U.S.C. 154(b) by 64 days.

(21) Appl. No.: 15/596,724

(22) Filed: May 16, 2017

(65) Prior Publication Data

US 2017/0352141 A1 Dec. 7, 2017

(30) Foreign Application Priority Data

Jun. 3, 2016 (JP) .................................. 2016-112085

(51) Int. Cl.
| | | |
|---|---|---|
| *G06T 7/00* | (2017.01) | |
| *G06T 5/20* | (2006.01) | |
| *G06T 11/60* | (2006.01) | |

(52) U.S. Cl.
CPC ................ *G06T 7/001* (2013.01); *G06T 5/20* (2013.01); *G06T 11/60* (2013.01);
(Continued)

(58) Field of Classification Search
CPC . G06T 7/001; G06T 5/20; G06T 11/60; G06T 2207/30164; G06T 2207/20216; G06T 2207/20032; G06T 2207/10061
See application file for complete search history.

(56) References Cited

U.S. PATENT DOCUMENTS

| | | | | |
|---|---|---|---|---|
| 7,551,767 B2 * | 6/2009 | Tsuchiya | ............... | G06T 7/0004 348/130 |
| 8,983,140 B2 * | 3/2015 | Hohjoh | .............. | H04N 5/23277 382/107 |

(Continued)

FOREIGN PATENT DOCUMENTS

JP 2011-141133 7/2011

*Primary Examiner* — Ming Y Hon
(74) *Attorney, Agent, or Firm* — Oblon, McClelland, Maier & Neustadt, L.L.P.

(57) ABSTRACT

An inspection method according to one aspect of the present disclosure, includes: acquiring a plurality of first acquisition images of a first die having a predetermined pattern; acquiring a plurality of second acquisition images of a second die having the predetermined pattern; acquiring a plurality of third acquisition images of a third die having the predetermined pattern; producing a first average image with the first acquisition images; producing a second average image with the second acquisition images: producing a third average image with the third acquisition images; producing a first comparative image with the first average image and the second average image; producing a second comparative image with the second average image and the third average image; producing a third comparative image with the first average image and the third average image; producing a reference image with the first acquisition images, the second acquisition images, and the third acquisition images; performing first comparison between the first comparative image and the reference image; performing second comparison between the second comparative image and the reference image; performing third comparison between the third comparative image and the reference image; determining, when a first defect is detected in the first comparison and the third comparison, that the first die has the first defect; determining, when a second defect is detected in the first comparison and the second comparison, that the second die (Continued)

has the second defect; and determining, when a third defect is detected in the second comparison and the third comparison, that the third die has the third defect.

4 Claims, 9 Drawing Sheets

(52) U.S. Cl.
CPC ............... *G06T 2207/10061* (2013.01); *G06T 2207/20032* (2013.01); *G06T 2207/20216* (2013.01); *G06T 2207/30164* (2013.01)

(56) References Cited

U.S. PATENT DOCUMENTS

| | | | |
|---|---|---|---|
| 2005/0205781 A1* | 9/2005 | Kimba | G01N 21/95607 250/311 |
| 2006/0133660 A1* | 6/2006 | Ogi | G06T 7/001 382/149 |
| 2009/0041340 A1* | 2/2009 | Suzuki | G06K 9/00288 382/159 |
| 2010/0074516 A1* | 3/2010 | Kawaragi | G01N 21/956 382/149 |
| 2012/0026316 A1* | 2/2012 | Nagahama | G01N 21/95607 348/92 |
| 2016/0119617 A1* | 4/2016 | Sagar | H04N 5/23222 348/187 |

* cited by examiner

INSPECTION METHOD FOR DETECTING A DIE DEFECT

CROSS-REFERENCE TO RELATED APPLICATION

This application is based upon and claims the benefit of priority from Japanese Patent Applications No. 2016-112085, filed on Jun. 3, 2016, the entire contents of which are incorporated herein by reference.

FIELD OF THE INVENTION

Embodiments described herein relate generally to an inspection method. The present disclosure relates to, for example, an inspection method of inspecting a pattern by acquiring a secondary electron image of a pattern image emitted by irradiating an electron beam.

BACKGROUND OF THE INVENTION

Recently, a demand for precision management of a circuit line width required for semiconductor elements, has been increasingly high. A reduced projection lithography device referred to as a so-called stepper, exposes and transfers a pattern onto a wafer so as to form a circuit, using an original pattern including a circuit pattern formed (also referred to a photolithography mask or a reticle, and, hereinafter, referred to as a mask), so that the semiconductor elements are manufactured. Therefore, a pattern drawing apparatus using an electron beam capable of drawing a fine circuit pattern, is used in order to manufacture the mask for transferring the fine circuit pattern onto the wafer. The pattern drawing apparatus may be used so as to directly draw a pattern circuit onto a wafer.

Improvement of yields is necessary for the manufacture of LSI, such as a central processing unit (CPU) or a field programmable gate array (FPGA), involving significant manufacturing costs. One main cause that reduces the fields is a pattern defect of a mask used in exposing and transferring an ultra-fine pattern onto a semiconductor wafer with a photolithography technique. Recently, a scale required to be detected as a pattern defect has been considerably small accompanying with miniaturization of an LSI pattern scale formed on a semiconductor wafer. Therefore, a pattern inspection apparatus that inspects a defect of a transferring mask used in manufacturing LSI, preferably increases in precision.

A method of performing inspection by comparing an optical image including a pattern formed on a sample, such as a photolithography mask, captured with a predetermined magnification with a magnification optical system, and design data or an optical image including the same pattern on a sample, captured, has been known as an inspection method. Examples of a pattern inspection method, include "die to die inspection" including: comparing pieces of optical image data including the same pattern captured at a different position on the same mask, and "die to database inspection" including: inputting drawing data (pattern data) including CAD data including pattern design made, converted into an apparatus input format to be input by a drawing apparatus in drawing a pattern onto a mask, into an inspection apparatus, generating design image data (a reference image) based on the drawing data, and comparing an optical image including the pattern captured, being measurement data, to the design image data. In the inspection method with the inspection apparatus, a sample is mounted on a stage and then the stage moves so that a light beam scans on the sample and the inspection is performed. A light source and an illumination optical system irradiate the sample with the light beam. Light that has passed through or reflected from the sample, forms an image on a photodetector through an optical system. The image captured by the photodetector is transmitted, as measurement data, to a comparative circuit. The comparative circuit compares the measurement data and the reference data in accordance with an appropriate algorithm after positioning between the images, and determines that a pattern defect is present when inconsistency is acquired.

The pattern inspection apparatus described above, irradiates a substrate with a laser beam and then captures a transmitted image or a reflected image of the laser beam so as to acquire an optical image. In contrast to this, an inspection apparatus that irradiates a substrate with an electron beam and detects a secondary electron emitted from the substrate so as to acquire a pattern image, has been also progressively developed. Patent Document 1 discloses a technique of capturing a previously set region for a plurality of dies formed on a sample, acquiring a SEM image, and producing an average image of the SEM image for a reference image.

SUMMARY OF THE INVENTION

An inspection method according to one aspect of the present disclosure, includes: acquiring a plurality of first acquisition images of a first die having a predetermined pattern; acquiring a plurality of second acquisition images of a second die having the predetermined pattern; acquiring a plurality of third acquisition images of a third die having the predetermined pattern; producing a first average image with the first acquisition images; producing a second average image with the second acquisition images: producing a third average image with the third acquisition images; producing a first comparative image with the first average image and the second average image; producing a second comparative image with the second average image and the third average image; producing a third comparative image with the first average image and the third average image; producing a reference image with the first acquisition images, the second acquisition images, and the third acquisition images; performing first comparison between the first comparative image and the reference image; performing second comparison between the second comparative image and the reference image; performing third comparison between the third comparative image and the reference image; determining, when a first defect is detected in the first comparison and the third comparison, that the first die has the first defect; determining, when a second defect is detected in the first comparison and the second comparison, that the second die has the second defect; and determining, when a third defect is detected in the second comparison and the third comparison, that the third die has the third defect.

DETAILED DESCRIPTION OF THE EMBODIMENTS

First Embodiment

An inspection method according to the present embodiment, includes: acquiring a plurality of first acquisition images of a first die having a predetermined pattern; acquiring a plurality of second acquisition images of a second die having the predetermined pattern; acquiring a plurality of third acquisition images of a third die having the predetermined pattern; producing a first average image with the first acquisition images; producing a second average image with the second acquisition images: producing a third average image with the third acquisition images; producing a first comparative image with the first average image and the second average image; producing a second comparative image with the second average image and the third average image; producing a third comparative image with the first average image and the third average image; producing a reference image with the first acquisition images, the second acquisition images, and the third acquisition images; performing first comparison between the first comparative image and the reference image; performing second comparison between the second comparative image and the reference image; performing third comparison between the third comparative image and the reference image; determining, when a first defect is detected in the first comparison and the third comparison, that the first die has the first defect; determining, when a second defect is detected in the first comparison and the second comparison, that the second die has the second defect; and determining, when a third defect is detected in the second comparison and the third comparison, that the third die has the third defect.

Figure 1:
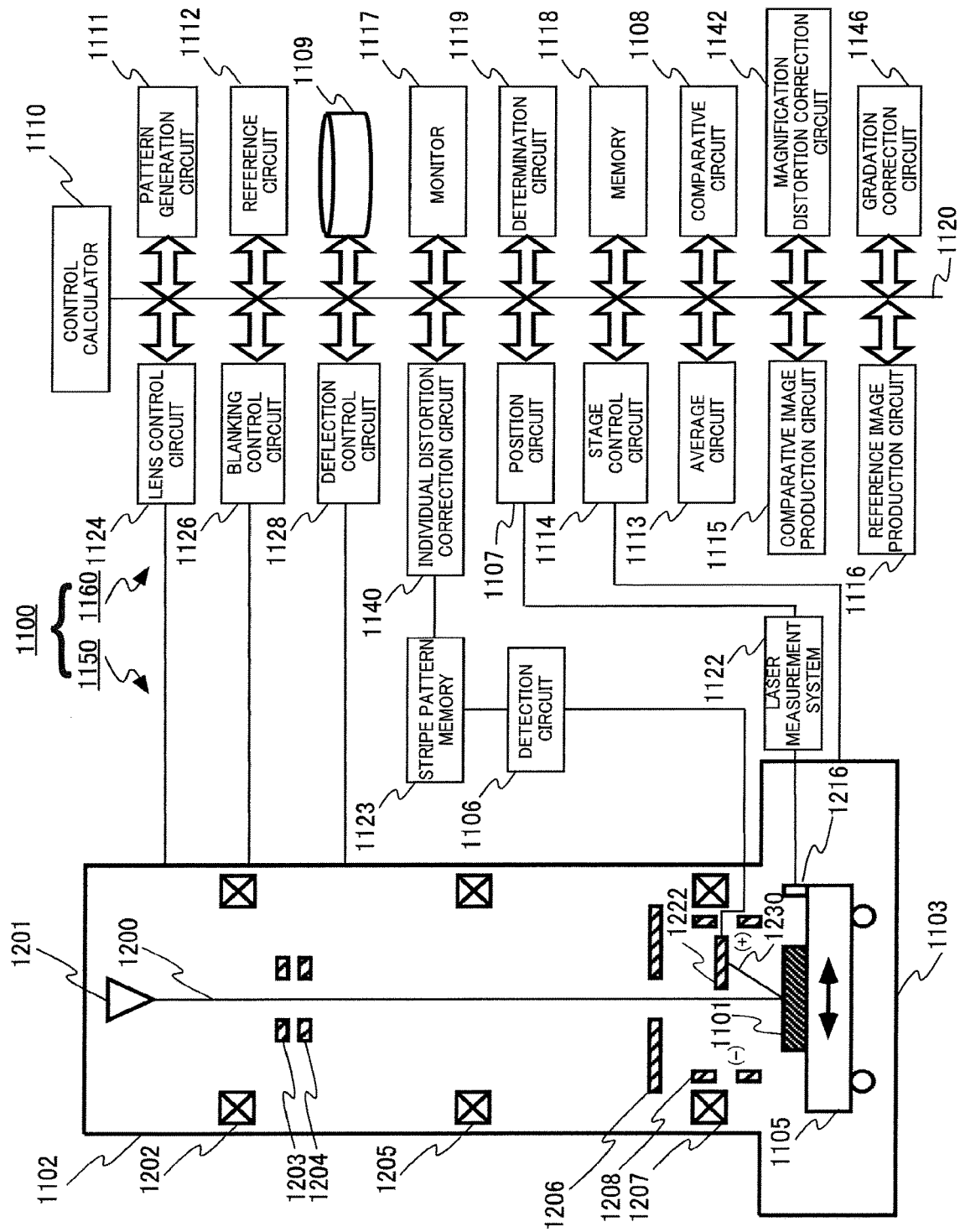
FIG. 1 is a schematic block diagram of an inspection apparatus used for an inspection method according to a first embodiment.

FIG. 1 is a schematic block diagram of an inspection apparatus 1100 used for the inspection method according to the present embodiment. The inspection apparatus 1100 that inspects a pattern formed on a substrate 1101 in FIG. 1, is an exemplary electron beam inspection apparatus that acquires a secondary electron image of a pattern image emitted by irradiating an electron so as to inspect a pattern. The inspection apparatus 1100 includes an optical image acquisition apparatus 1150 and a control system circuit 1160. The optical image acquisition apparatus 1150 includes an electron beam column 1102 (an electron optical column), an inspection chamber 1103, a detection circuit 1106, a image memory 1123, and a laser measurement system 1122. An electron gun 1201, an illumination lens 1202, a forming aperture array member 1203, a blanking aperture array 1204, reducing glass 1205, a limiting aperture member 1206, an objective lens 1207, a deflector 1208, and a detector 1222 are disposed in the electron beam column 1102.

An XY stage 1105 movable at least in an XY direction is disposed in the inspection chamber 1103. The substrate 1101 including a plurality of graphic patterns being an object to be inspected or formed is disposed on the XY stage 1105. As described above, the substrate 1101 includes a mask for exposure or a semiconductor substrate, such as a silicon wafer. The substrate 1101 is, for example, disposed on the XY stage 1105 with a pattern forming face facing upward. A mirror 1216 that reflects a laser beam for laser measurement irradiated from the laser measurement system 1122 disposed outside the inspection chamber 1103 is disposed on the XY stage 1105. The detector 1222 detects a secondary electron 1230 emitted from the object to be inspected. The detector 1222 is coupled to the detection circuit 1106 outside the electron beam column 1102. The detection circuit 1106 is coupled to the image memory 1123.

In the control system circuit 1160, a control calculator 1110 being a computer is coupled to a position circuit 1107, a comparative circuit 1108, a pattern generation circuit 1111, a reference circuit 1112, an average circuit 1113, a stage control circuit 1114, a comparative image production circuit 1115, a reference image production circuit 1116, a determination circuit 1119, a lens control circuit 1124, a blanking control circuit 1126, a deflection control circuit 1128, an individual distortion correction circuit 1140, a magnification distortion correction circuit 1142, a gradation correction circuit 1146, a storage device 1109, such as a magnetic disk drive, a monitor 1117, and a memory 1118 through a bus 1120. The image memory 1123 is coupled to the individual distortion correction circuit 1140. The stage control circuit 1114 drives the XY stage 1105 under control of the control calculator 1110. The movement can be made by a drive system similar to a triaxial (X-Y-θ) motor that drives in an X direction, a Y direction, and a θ direction. An example of the X motor, the Y motor, and the θ motor not illustrated that can be used include a step motor. The XY stage 1105 is capable of moving in a horizontal direction and a rotation direction with the motor of each of the X, Y, and θ axes. The laser measurement system 1122 measures a movement position of the XY stage 1105 so as to supply the movement position to a position circuit 1107.

The laser measurement system 1122 receives reflected light from the mirror 1216 and then measures the position of the XY stage 1105 with the principle of laser interferometry, so as to measure the position of a die on the substrate 1101. The laser measurement system 1122 includes, for example, a laser interferometer generation source that generates a laser, and a laser interferometer detection circuit that detects the reflected light reflecting from the mirror 1216. Note that the mechanism of the laser measurement system 1122 is not limited to this.

The position measurement of the die on the substrate 1101 with the laser measurement system 1122, is performed, for example, as follows: First, the XY stage 1105 moves so that a reference mark provided on the substrate 1101 is disposed on an extension line of the electron beam 1200. Next, the laser measurement system 1122 measures the position of the XY stage 1105 at this time so that the measurement point is defined as an origin. Next, the XY stage 1105 moves so that the die being an object to be evaluated is disposed on the extension line of the electron beam 1200. Next, the laser measurement system 1122 measures the movement distance of the XY stage 1105 at this time. Then, the movement distance is defined as the position of the die being the object to be evaluated. Note that the method of measuring the position of the die with the laser measurement system 1122 is not limited to this.

A high-voltage power supply circuit not illustrated is coupled to the electron gun 1201, and application of an acceleration voltage from the high-voltage power supply circuit between a cathode and an anode not illustrated in the electron gun 1201 together with application of a predetermined bias voltage and heating of the cathode at a predetermined temperature, accelerate an electron group emitted from the cathode so that the electron group becomes the electron beam 1200 to be emitted. The illumination lens 1202, the reducing glass 1205, and the objective lens 1207 each include, for example, an electron lens, and are controlled together by the lens control circuit 1124. As to be described later, a plurality of individual blanking mechanisms is disposed in the blanking aperture array 1204, and a control signal to each individual blanking mechanism is output from the blanking control circuit 1126. The deflector 1208 includes a plurality of electrode groups, and is controlled by the deflection control circuit 1128.

When the substrate 1101 is the mask for the exposure, in forming a plurality of graphical patterns onto the mask for the exposure with a drawing apparatus not illustrated, such as an electron beam drawing apparatus, drawing data used in the drawing apparatus is input from the outside of the inspection apparatus 1100 so as to be stored in the storage device 1109. When the substrate 1101 is the semiconductor substrate, exposure image data is input from the outside of the inspection apparatus 1100 so as to be stored in the storage device 1109, the exposure image data including an exposure image on the substrate in exposing and transferring a mask pattern of the mask for the exposure onto the semiconductor substrate, defined. The exposure image data is at least produced by, for example, a spatial image capturing apparatus not illustrated.

Here, FIG. 1 illustrates a configuration necessary for describing the present embodiment. The inspection apparatus 1100 may typically include a necessary different configuration.

Figure 2:
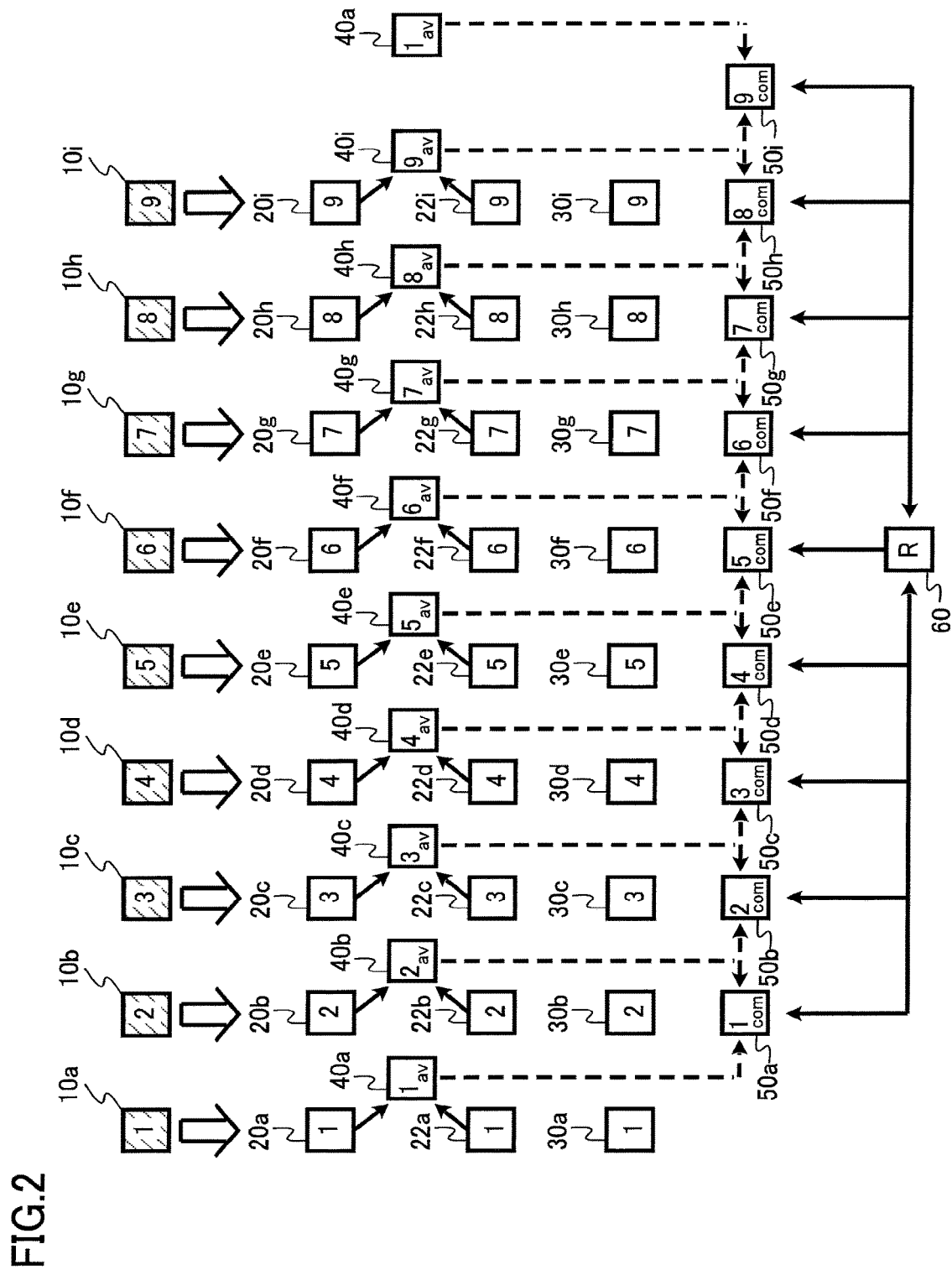
FIG. 2 is a schematic diagram of the inspection method according to the first embodiment.
Figure 3:
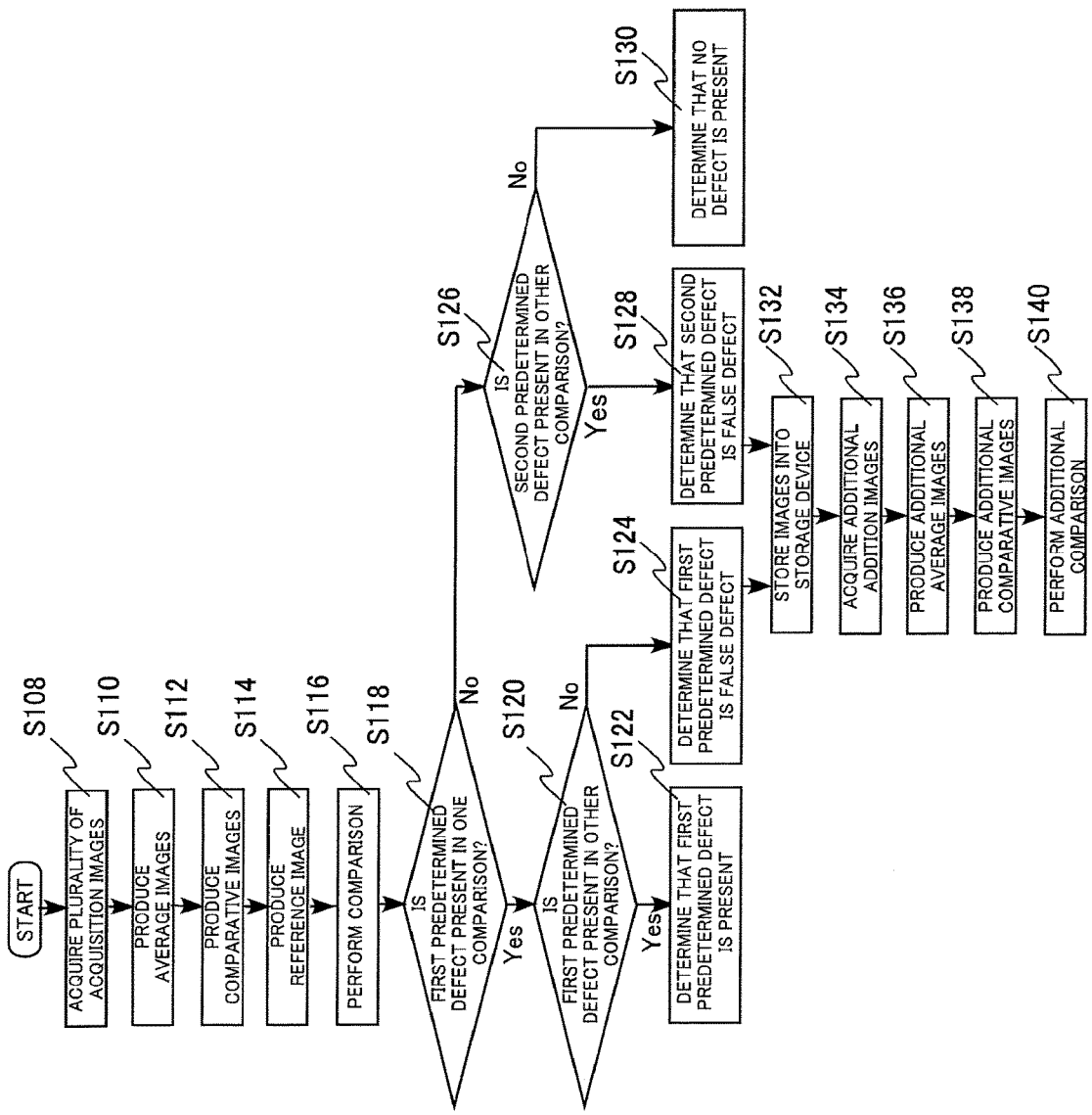
FIG. 3 is a flow chart of the inspection method according to the first embodiment.

FIG. 2 is a schematic diagram of the inspection method according to the present embodiment. FIG. 3 is a flow chart of the inspection method according to the present embodiment.

According to the present embodiment, inspection is performed to the first die 10*a*, the second die 10*b*, the third die 10*c*, a fourth die 10*d*, a fifth die 10*e*, a sixth die 10*f*, a seventh die 10*g*, an eighth die 10*h*, and a ninth die 10*i*, provided on the substrate 1101. Here, all the dies have the same predetermined pattern.

First, the control calculator 1110 irradiates the substrate 1101 with the electron beam 1200.

Next, the control calculator 1110 detects the secondary electron 1230 emitted from the first die 10*a* using the detector 1222 and the detection circuit 1106, so as to acquire the first acquisition image 20*a* of the first die 10*a*. The detection is repeated so that the first acquisition image 22*a* is further acquired. In this manner, the control calculator 1110 acquires the first acquisition image 20*a* and the first acquisition image 22*a*.

Similarly, the control calculator 1110 individually acquires the second acquisition image 20*b* and the second acquisition image 22*b* of the second die 10*b*, the third acquisition image 20*c* and the third acquisition image 22*c* of the third die 10*c*, a fourth acquisition image 20*d* and a fourth acquisition image 22*d* of the fourth die 10*d*, a fifth acquisition image 20*e* and a fifth acquisition image 22*e* of the fifth die 10*e*, a sixth acquisition image 20*f* and a sixth acquisition image 22*f* of the sixth die 10*f*, a seventh acquisition image 20*g* and a seventh acquisition image 22*g* of the seventh die 10*g*, an eighth acquisition image 20*h* and an eighth acquisition image 22*h* of the eighth die 10*h*, and a ninth acquisition image 20*i* and a ninth acquisition image 22*i* of the ninth die 10*i* (S108). Note that the number of the acquisition images with respect to each die is not limited to two images. The acquisition images that have been acquired are, for example, stored in the memory 1118.

Next, the control calculator 1110 produces the first average image 40*a* with the first acquisition image 20*a* and the first acquisition image 22*a*. Similarly, the control calculator 1110 individually produces the second average image 40*b* with the second acquisition image 20*b* and the second acquisition image 22*b*, the third average image 40*c* with the third acquisition image 20*c* and the third acquisition image 22*c*, a fourth average image 40*d* with the fourth acquisition image 20*d* and the fourth acquisition image 22*d*, a fifth average image 40*e* with the fifth acquisition image 20*e* and the fifth acquisition image 22*e*, a sixth average image 40*f* with the sixth acquisition image 20*f* and the sixth acquisition image 22*f*, a seventh average image 40*g* with the seventh acquisition image 20*g* and the seventh acquisition image 22*g*, an eighth average image 40*h* with the eighth acquisition image 20*h* and the eighth acquisition image 22*h*, and a ninth average image 40*i* with the ninth acquisition image 20*i* and the ninth acquisition image 22*i* (S110). Here, the control calculator 1110 produces the average images using the average circuit 1113. An exemplary method of producing the average images includes: allocating a memory space for addition images into the memory 1118; and performing addition processing of each acquisition image in the memory space for the addition images. Note that a publicly known method of averaging images and a method described in the present specification both can be preferably used.

Next, the control calculator 1110 produces the first comparative image 50*a* with the first average image 40*a* and the second average image 40*b*. Similarly, the control calculator 1110 individually produces the second comparative image 50*b* with the second average image 40*b* and the third average image 40*c*, the third comparative image 50*c* with the third average image 40*c* and the fourth average image 40*d*, a fourth comparative image 50*d* with the fourth average image 40*d* and the fifth average image 40*e*, a fifth comparative image 50*e* with the fifth average image 40*e* and the sixth average image 40*f*, a sixth comparative image 50*f* with the sixth average image 40*f* and the seventh average image 40*g*, a seventh comparative image 50*g* with the seventh average image 40*g* and the eighth average image 40*h*, an eighth comparative image 50*h* with the eighth average image 40*h* and the ninth average image 40*i*, and a ninth comparative image 50*i* with the ninth average image 40*i* and the first average image 40*a* (S112). Here, the control calculator 1110 produces the comparative images using the comparative image production circuit 1115. An exemplary method of producing the comparative images includes: allocating a memory space for comparative images into the memory 1118; performing addition processing of each average image in the memory space for the comparative images, and performing filter processing and division processing appropriately. Note that a publicly known method of averaging images and a method described in the present specification both can be preferably used.

Next, the control calculator 1110 produces the reference image 60 with the first acquisition image 20*a*, the first acquisition image 22*a*, the second acquisition image 20*b*, the second acquisition image 22*b*, the third acquisition image 20*c*, the third acquisition image 22*c*, the fourth acquisition image 20*d*, the fourth acquisition image 22*d*, the fifth acquisition image 20e, the fifth acquisition image 22e, the sixth acquisition image 20f, the sixth acquisition image 22f, the seventh acquisition image 20g, the seventh acquisition image 22g, the eighth acquisition image 20h, the eighth acquisition image 22h, the ninth acquisition image 20i or the ninth acquisition image 22i (S114). Here, the control calculator 1110 produces the reference image 60 using the reference image production circuit 1116. A publicly known image processing method and an image processing method described in the present specification both can be preferably used for a method of producing the reference image 60. The first to ninth acquisition images that have been acquired may be entirely or partially used for the production of the reference image 60. Furthermore, the control calculator 1110 may generate the pattern data stored in the storage device 1109 using the pattern generation circuit 1111 so as to produce the reference image 60.

Next, the control calculator 1110 using the comparative circuit 1108, performs the first comparison between the first comparative image 50a and the reference image 60, the second comparison between the second comparative image 50b and the reference image 60, the third comparison between the third comparative image 50c and the reference image 60, fourth comparison between the fourth comparative image 50d and the reference image 60, fifth comparison between the fifth comparative image 50e and the reference image 60, sixth comparison between the sixth comparative image 50f and the reference image 60, seventh comparison between the seventh comparative image 50g and the reference image 60, eighth comparison between the eighth comparative image 50h and the reference image 60, and ninth comparison between the ninth comparative image 50i and the reference image 60 (S116). Here, an exemplary comparative method includes comparing a pixel value at each position in each comparative image and a pixel value at the corresponding position in the reference image.

Next, an operator or the control calculator 1110 using the determination circuit 1119 determines whether a defect is present, with the first comparison, the second comparison, the third comparison, the fourth comparison, the fifth comparison, the sixth comparison, the seventh comparison, the eighth comparison, and the ninth comparison. When the first defect is detected in the first comparison and the ninth comparison, the operator or the control calculator 1110 determines that the first die 10a has the first defect. Similarly, when the second defect is detected in the first comparison and the second comparison, the second die 10b is determined to have the second defect, when the third defect is detected in the second comparison and the third comparison, the third die 10c is determined to have the third defect, when a fourth defect is detected in the third comparison and the fourth comparison, the fourth die 10d is determined to have the fourth defect, when a fifth defect is detected in the fourth comparison and the fifth comparison, the fifth die 10e is determined to have the fifth defect, when a sixth defect is detected in the fifth comparison and the sixth comparison, the sixth die 10f is determined to have the sixth defect, when a seventh defect is detected in the sixth comparison and the seventh comparison, the seventh die 10g is determined to have the seventh defect, when an eighth defect is detected in the seventh comparison and the eighth comparison, the eighth die 10h is determined to have the eighth defect, and when a ninth defect is detected in the eighth comparison and the ninth comparison, the ninth die 10i is determined to have the ninth defect.

Here, with the first comparison and the ninth comparison for example, the first comparison and the ninth comparison will be described as "one comparison" and "the other comparison", respectively. First, the one comparison is used in order to determine whether a first predetermined defect is present (S118). When the first predetermined defect is detected, the other comparison is used in order to determine whether the first predetermined defect is present (S120). When the first predetermined defect is detected in the other comparison, the first die 10a is determined to have the first predetermined defect (S122). When the first predetermined defect is not detected in the other comparison, the first predetermined defect is determined to be a false defect (S124). Meanwhile, when the first predetermined defect is not detected, the other comparison is used in order to determine whether a second predetermined defect is present (S126). When the second predetermined defect is detected, this means that no predetermined defect common between the one comparison and the other comparison has been detected, so that the second predetermined defect is determined to be a false defect (S128). When the second predetermined defect is not detected, the first die 10a is determined to have no defect (S130). When a false defect is determined to be present, the comparative images and the reference image of the corresponding portion may be stored in the storage device 1109 (S132). Note that when the first predetermined defect is detected in the first comparison and the first predetermined defect is not detected in the ninth comparison or when the first predetermined defect is detected in the ninth comparison and the first predetermined defect is not detected in the first comparison, the first predetermined defect may be determined to be a first false defect.

When reinspection is performed to all the dies, the control calculator 1110 acquires an additional addition image 30a of the first die 10a, an additional addition image 30b of the second die 10b, an additional addition image 30c of the third die 10c, an additional addition image 30d of the fourth die 10d, an additional addition image 30e of the fifth die 10e, an additional addition image 30f of the sixth die 10f, an additional addition image 30g of the seventh die 10g, an additional addition image 30h of the eighth die 10h, and an additional addition image 30i of the ninth die 10i (S134).

Next, the control calculator 1110 produces a first additional average image 42a with the first acquisition image 20a, the first acquisition image 22a, and the additional addition image 30a of the first die 10a. Similarly, the control calculator 1110 produces a second additional average image 42b of the second die 10b, a third additional average image 42c of the third die 10c, a fourth additional average image 42d of the fourth die 10d, a fifth additional average image 42e of the fifth die 10e, a sixth additional average image 42f of the sixth die 10f, a seventh additional average image 42g of the seventh die 10g, an eighth additional average image 42h of the eighth die 10h, and a ninth additional average image 42i of the ninth die 10i (S136).

Next, the control calculator 1110 produces a first additional comparative image 52a with the first additional average image 42a and the second additional average image 42b. Similarly, the control calculator 1110 produces a second additional comparative image 52b, a third additional comparative image 52c, a fourth additional comparative image 52d, a fifth additional comparative image 52e, a sixth additional comparative image 52f, a seventh additional comparative image 52g, an eighth additional comparative image 52h, and a ninth additional comparative image 52i (S138).

Next, the control calculator 1110 performs first additional comparison between the first additional comparative image 52*a* and the reference image 60, second additional comparison between the second additional comparative image 52*b* and the reference image 60, third additional comparison between the third additional comparative image 52*c* and the reference image 60, fourth additional comparison between the fourth additional comparative image 52*d* and the reference image 60, fifth additional comparison between the fifth additional comparative image 52*e* and the reference image 60, sixth additional comparison between the sixth additional comparative image 52*f* and the reference image 60, seventh additional comparison between the seventh additional comparative image 52*g* and the reference image 60, eighth additional comparison between the eighth additional comparative image 52*h* and the reference image 60, and ninth additional comparison between the ninth additional comparative image 52*i* and the reference image 60 (S140). Note that when the dies to be reinspected are limited, the acquisition images to be acquired, the additional average images to be produced, the additional comparative images to be produced, and the additional comparison to be performed, are appropriately limited. When a portion of a die to be reinspected is specified, only an image for the portion of the die is at least acquired.

Note that, when reinspection is performed, the processing may go back to S108 of FIG. 3, again.

Performing inspection with an image having a large noise component being used in comparison degrades inspection precision, and thus the noise component is preferably reduced by acquiring the image a plurality of times and making an average. However, simply increasing the acquisition count of the image increases inspection duration in quantity of the count, and thus an image having a small noise component is preferably acquired for the inspection duration as short as possible.

The first comparative image 50*a* is produced with the first average image 40*a* and the second average image 40*b* in the inspection method according to the present embodiment. Here, the first average image 40*a* is produced with the first acquisition images 20*a* and 22*a*, and the second average image 40*b* is produced with the second acquisition images 20*b* and 22*b*. That is, according to the present embodiment, a plurality of acquisition images acquired from a plurality of dies is used, and thus the acquisition images of the different die are used so that an image with noise reduced can be acquired with inspection duration inhibited from increasing.

The first comparative image 50*a* and the ninth comparative image 50*i* have information on the acquisition images of the first die 10*a*. Thus, when the first defect is detected in both of the first comparison and the ninth comparison, the first die 10*a* is determined to have the first defect so that the defect can be determined with the image with noise reduced.

When the defect is detected in only the first comparison or the ninth comparison, the defect is determined to be a false defect so that the degree of the defect can be determined in detail with the inspection duration inhibited from increasing.

Note that dies having successive numbers, for example, the first die 10*a* and the second die 10*b* may be disposed at positions adjacent to each other or are not necessarily disposed at the position adjacent to each other, on the substrate 101. Note that the dies having the successive numbers are adjacently disposed so that the apparatus can be more easily designed.

According to the present embodiment, two average images, for example, the first average image 40*a* and the second average image 40*b* are used in order to produce a comparative image. The inspection can be preferably performed even with at least three average images. However, the amount of information on the defect is reduced with the amount of information on a different average image as an averaging image number increases. Therefore, the number of the average images used in order to produce a comparative image, is preferably reduced as much as possible.

According to the inspection method of the present embodiment, an inspection method capable of efficiently removing a noise component can be provided.

Second Embodiment

An inspection method according to the present embodiment, includes: acquiring a first common addition image of a first predetermined number of a first die having a predetermined pattern; acquiring a first individual addition image of a second predetermined number of the first die; acquiring a second common addition image of the first predetermined number of a second die having the predetermined pattern; acquiring a second individual addition image of the second predetermined number of the second die; producing a first average image with the first common addition image, the second common addition image, and the first individual addition image; producing a second average image with the first common addition image, the second common addition image, and the second individual addition image; producing a reference image with the first common addition image and the second common addition image or with the first common addition image, the first individual addition image, the second common addition image, and the second individual addition image; performing first comparison between the first average image and the reference image; performing second comparison between the second average image and the reference image; determining whether a first defect of the first die is present; and determining whether a second defect of the second die is present.

Figure 4:
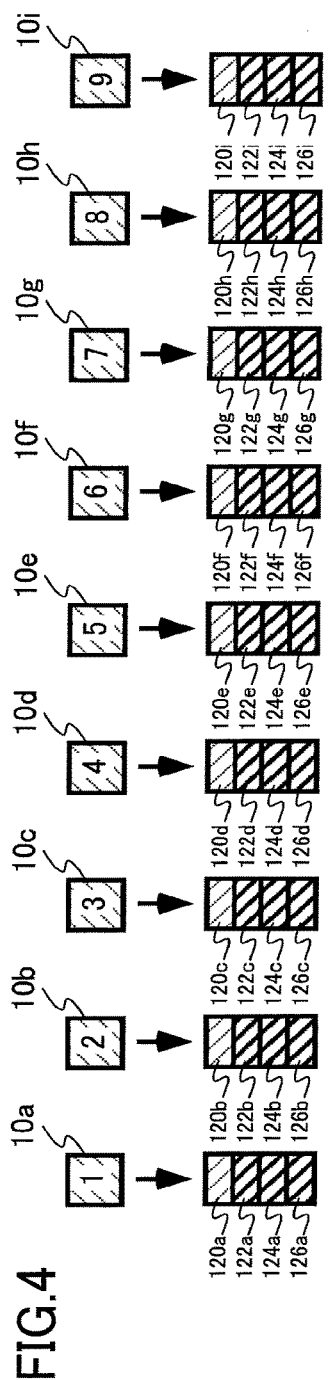
FIG. 4 is a schematic diagram of an inspection method according to a second embodiment.
Figure 4:
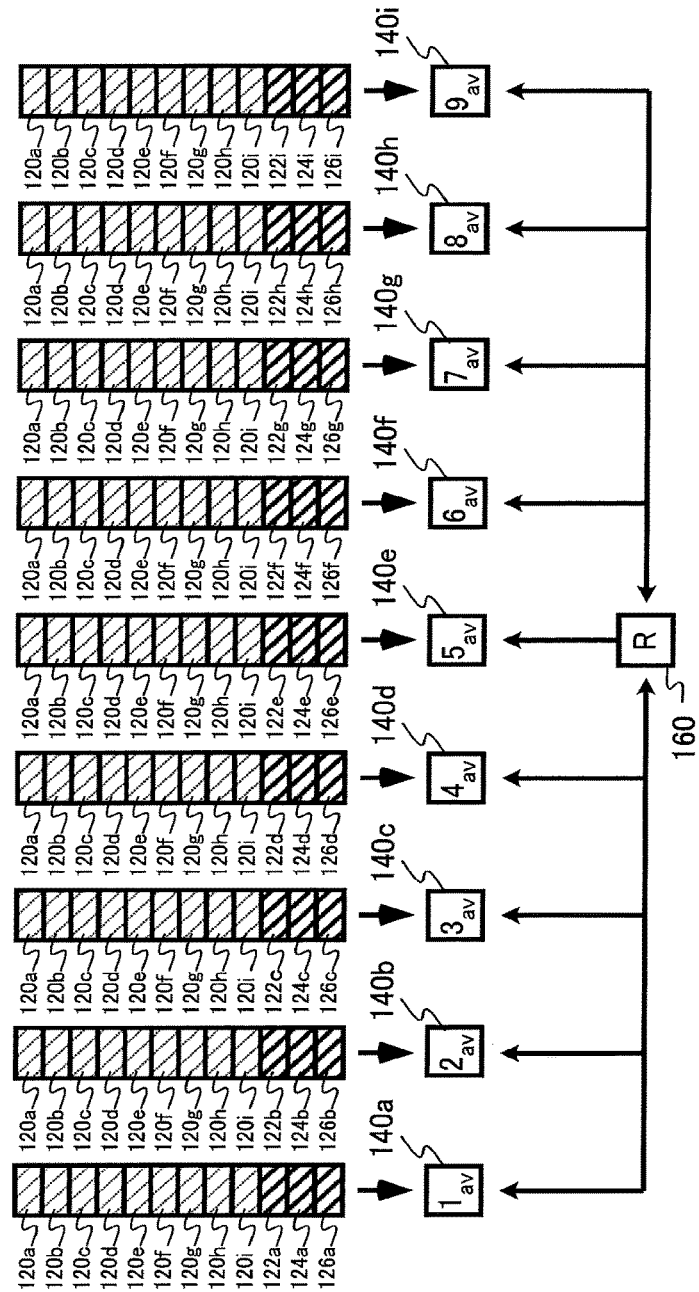
Figure 5:
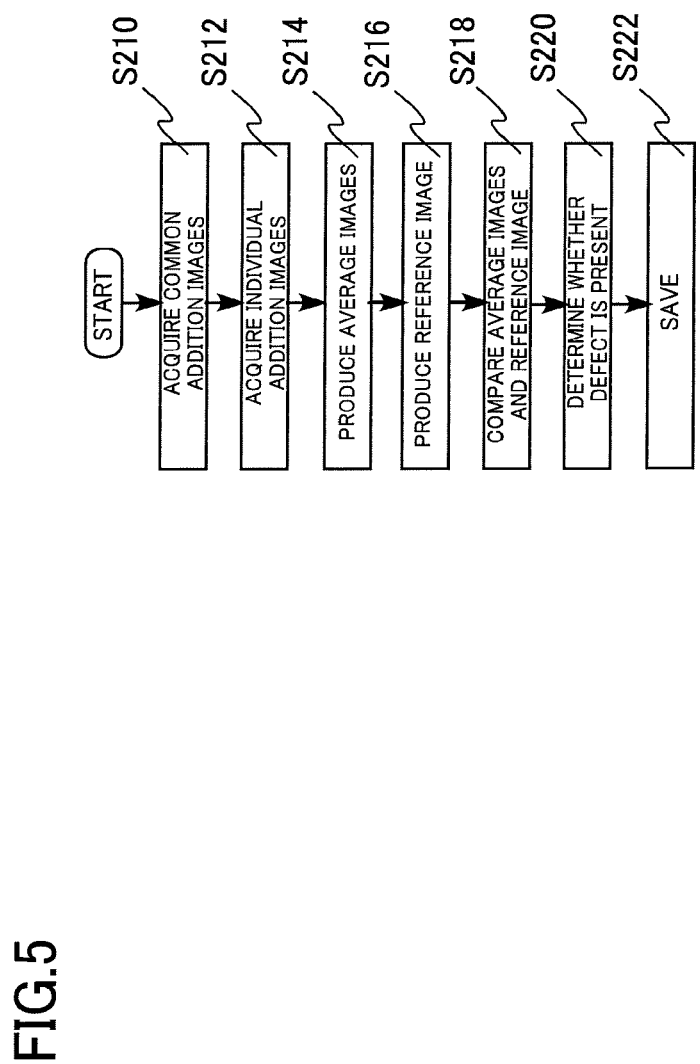
FIG. 5 is a flow chart of the inspection method according to the second embodiment.

FIG. 4 is a schematic diagram of the inspection method according to the present embodiment. FIG. 5 is a flow chart of the inspection method according to the present embodiment.

According to the present embodiment, inspection is performed to the first die 10*a*, the second die 10*b*, a third die 10*c*, a fourth die 10*d*, a fifth die 10*e*, a sixth die 10*f*, a seventh die 10*g*, an eighth die 10*h*, and a ninth die 10*i*, provided on a substrate 1101. Here, all the dies have the same predetermined pattern.

First, a control calculator 1110 irradiates the substrate 1101 with an electron beam 1200.

Next, the control calculator 1110 detects a secondary electron emitted from the first die 10*a* with a detector 222 and a detector 106 so as to acquire the first common addition image 120*a* of the first predetermined number of the first die 10*a*, the second common addition image 120*b* of the first predetermined number of the second die 10*b*, a third common addition image 120*c* of the first predetermined number of the third die 10*c*, a fourth common addition image 120*d* of the first predetermined number of the fourth die 10*d*, a fifth common addition image 120*e* of the first predetermined of the fifth die 10*e*, a sixth common addition image 120*f* of the first predetermined number of the sixth die 10*f*, a seventh common addition image 120*g* of the first predetermined number of the seventh die 10*g*, an eighth common addition image 120*h* of the first predetermined number of the eighth die 10*h*, and a ninth common addition image 120*i* of the first predetermined number of the ninth die 10*i* (S210). Note that the first predetermined number is an integer of 1 or more. As described above, here, the first predetermined number is 1, but the first predetermined number is not limited to this.

Next, the control calculator 1110 acquires the first individual addition images 122a, 124a, and 126a of the second predetermined number of the first die 10a. Similarly, the control calculator 1110 acquires the second individual addition images 122b, 124b, and 126b of the second predetermined number of the second die 10b, third individual addition images 122c, 124c, and 126c of the second predetermined number of the third die 10c, fourth individual addition image 122d, 124d, and 126d of the second predetermined number of the fourth die 10d, fifth individual addition images 122e, 124e, and 126e of the second predetermined number of the fifth die 10e, sixth individual addition images 122f, 124f, and 126f of the second predetermined number of the sixth die 10f, seventh individual addition image 122g, 124g, and 126g of the second predetermined number of the seventh die 10g, eighth individual addition images 122h, 124h, and 126h of the second predetermined number of the eighth die 10h, and ninth individual addition images 122i, 124i, and 126i of the second predetermined number of the ninth die 10i (S212). Note that the second predetermined number is an integer of 1 or more. Note that, as described above, the second predetermined number is 3, but the second predetermined number is not limited to this.

Here, the common addition images and the individual addition images are preferably the same in terms of acquisition conditions, in order to produce the average images or perform filter processing, simply.

Next, the control calculator 1110 produces the first average image 140a with the first common addition image 120a of the first predetermined number, the second common addition image 120b of the first predetermined number, the third common addition image 120c of the first predetermined number, the fourth common addition image 120d of the first predetermined number, the fifth common addition image 120e of the first predetermined number, the sixth common addition image 120f of the first predetermined number, the seventh common addition image 120g of the first predetermined number, the eighth common addition image 120h of the first predetermined number, the ninth common addition image 120i of the first predetermined number, and the first individual addition images 122a 124a, and 126a of the second predetermined number. Similarly, the control calculator 1110 individually produces the second average image 140b with the first to ninth common addition images of the first predetermined number and the second individual addition images of the second predetermined number, a third average image 140c with the first to ninth common addition images of the first predetermined number and the third individual addition images of the second predetermined number, a fourth average image 140d with the first to ninth common addition images of the first predetermined number and the fourth individual addition images of the second predetermined number, a fifth average image 140e with the first to ninth common addition images of the first predetermined number and the fifth individual addition images of the second predetermined number, a sixth average image 140f with the first to ninth common addition images of the first predetermined number and the sixth individual addition images of the second predetermined number, a seventh average image 140g with the first to ninth common addition images of the first predetermined number and the seventh individual addition images of the second predetermined number, an eighth average image 140h with the first to ninth common addition images of the first predetermined number and the eighth individual addition images of the second predetermined number, and a ninth average image 140i with the first to ninth common addition images of the first predetermined number and the ninth individual addition images of the second predetermined number (S214). Note that the common addition images and the individual addition images may be partially used in order to produce the average images, instead of all the common addition images and all the individual addition images.

Next, the control calculator 1110 produces the reference image 160 with the first to ninth common addition images of the first predetermined number or the first to ninth common addition images of the first predetermined number and the first to ninth individual addition images of the second predetermined number (S216). Note that the common addition images and individual addition images may be partially used in order to produce the reference image 160, instead of all the common addition images and all the individual addition images.

Next, the control calculator 1110 performs the first comparison between the first average image 140a and the reference image 160, the second comparison between the second average image 140b and the reference image 160, third comparison between the third average image 140c and the reference image 160, fourth comparison between the fourth average image 140d and the reference image 160, fifth comparison between the fifth average image 140e and the reference image 160, sixth comparison between the sixth average image 140f and the reference image 160, seventh comparison between the seventh average image 140g and the reference image 160, eighth comparison between the eighth average image 140h and the reference image 160, and ninth comparison between the ninth average image 140i and the reference image 160 (S218).

Next, an operator or the control calculator 1110 determines whether a defect is present, with the first comparison, the second comparison, the third comparison, the fourth comparison, the fifth comparison, the sixth comparison, the seventh comparison, the eighth comparison, and the ninth comparison (S220). Note that the comparative images and the reference image of the corresponding portion may be stored in a storage device 1109 in order to confirm a false defect later (S222).

According to the present embodiment, the first to ninth dies have the same predetermined pattern so that the common addition image acquired at each die can be used to reduce noise of the average images.

Using the individual addition images in addition to the common addition images, while the amount of information on a defect included in a die being an object to be inspected is increased, the amount of information on a defect included in the other die is decreased so that an average image can be produced. Therefore, noise of the average image is reduced and the defect being an object to be inspected can be detected in high precision.

As an averaging image number increases, an effect of reducing noise improves. As the ratio of the second predetermined number to the averaging image number increases, the detection of the defect becomes more advantageous. Here, the averaging image number is the number of images used in order to produce the image. The averaging image number of an average image according to the present embodiment, is acquired by the following expression: the first predetermined number x (the number of dies used for inspection)+the second predetermined number The averaging image number of the first average image 140a is as follows: 1×9+3=12 Note that, when the ratio of the second predetermined number to the same averaging image number increases, the inspection duration lengthens because the number of the images acquired for the inspection is as follows: (the first predetermined number+the second predetermined number)×(the number of the dies used for the inspection)

Here, a noise component of an image will be further described. The noise component of the image is proportional to $1/\{(\text{the amount of current})^{(0.5)}\}$ or $1/\{(\text{the amount of the current})^{0.5}\}$. That is, the noise component of the image decreases due to an averaging effect of the amount of the current, together with an increase of the amount of the current. The amount of the current is the product of the current value of the electron beam and the duration of the electron beam being irradiated.

Here, averaging k images and then acquiring one image mean that the acquisition of the one image consumes k times duration. Therefore, the noise component of the image including the k images averaged, is $1/(k^{0.5})$.

An effect similar to the above effect can be acquired by altering acquisition conditions of the image. That is, instead of acquiring k common addition images or k individual addition images, when the amount of the current necessary for the image acquisition is made to be k times by making the scanning speed of the electron beam 1/k, a noise reduction effect can be acquired even with one common addition image or one individual addition image, the noise reduction effect being similar to that in a case where the k common addition images or the k individual addition images are acquired. According to the method, the movement duration of a stage for a turn of the stage, can be reduced.

Note that the scanning speed of the electron beam is made to be 1/k and then an image acquisition count increases so that the noise reduction can be further made.

According to the inspection method of the present embodiment, an inspection method capable of efficiently removing a noise component can be provided.

Third Embodiment

An inspection method according to the present embodiment is different from those according to the first and second embodiments in that Gaussian filter processing having a sigma value based on an averaging image number, is performed to a reference image, a first comparative image, a second comparative image, a third comparative image, a first average image, a second average image, or a third average image. Here, the descriptions of points that duplicate with respect to the first and second embodiments, will be omitted.

Filter processing is performed to the reference image, acquisition images, the comparative images, and the average images in the inspection method according to the present embodiment, so that a noise component included in each image is reduced and the precision of defect determination can improve. Particularly, the Gaussian filter processing having the sigma (σ) value based on the averaging image number, is preferably performed. A Gaussian filter is a circular filter in shape and a blur barely occurs at a diagonal boundary portion of a pattern so that the Gaussian filter is suitable to the filter processing of an image of a die. Note that, for example, a circular filter having a parabolic shape or a publicly known filter is also preferably used.

An example of the averaging image number according to the present embodiment will be described. When the first average image 40a is produced with a first acquisition image 20a and a first acquisition image 22a, the averaging image number of the first average image 40a is 2. For example, when the reference image 60 is produced with the first acquisition image 20a, a second acquisition image 20b, a third acquisition image 20c, a fourth acquisition image 20d, a fifth acquisition image 20e, a sixth acquisition image 20f, a seventh acquisition image 20g, an eighth acquisition image 20h, and a ninth acquisition image 20i, the averaging image number of the reference image 60 is 9.

Figure 6A:
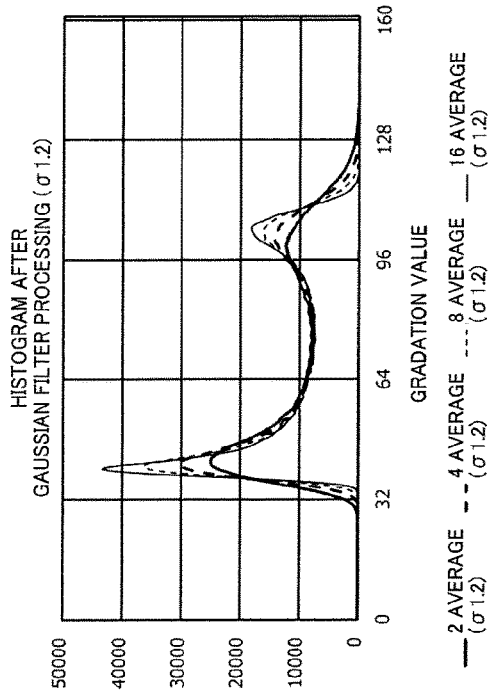
FIGS. 6A to 6C are graphical representations illustrating a gradation histogram of an average image according to a third embodiment.
Figure 6B:
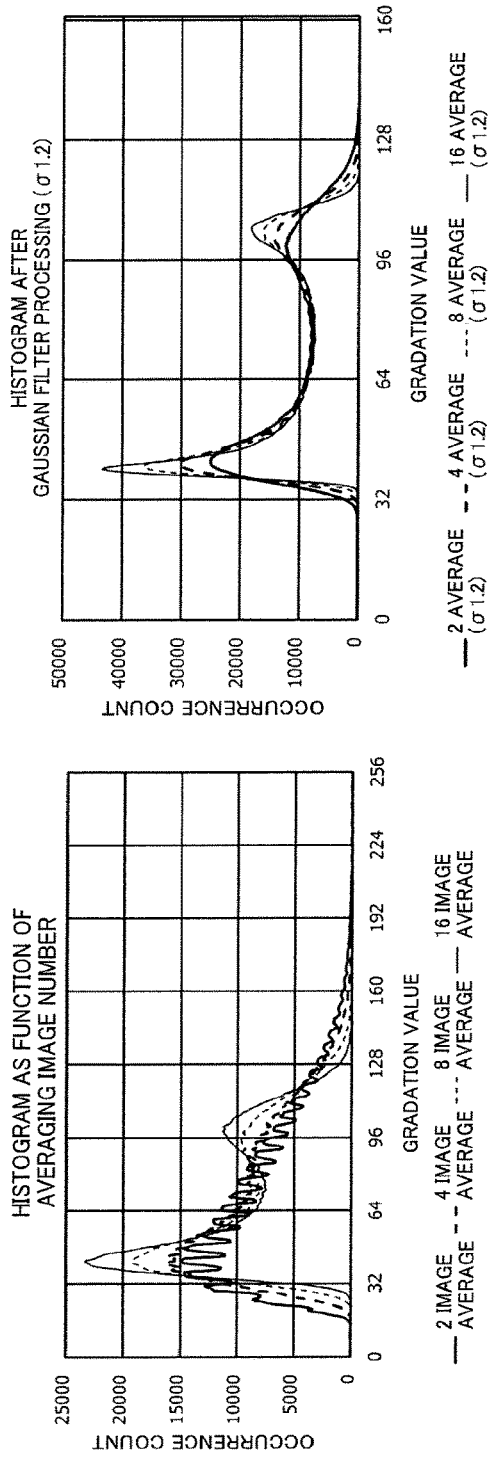
Figure 6C:
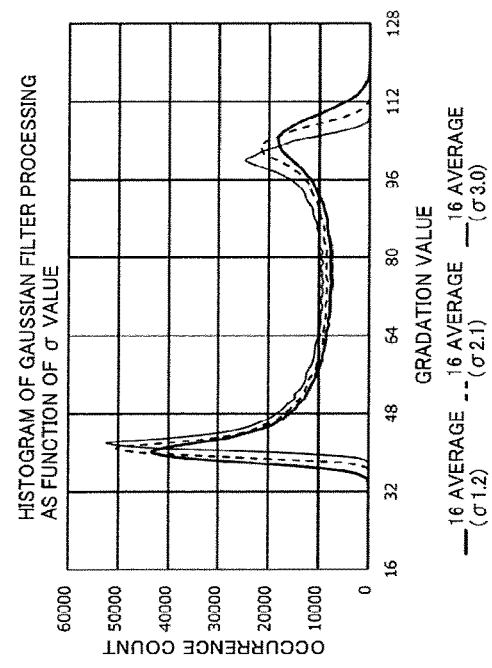

FIGS. 6A to 6C each illustrate a gradation histogram of an average image according to the present embodiment. A horizontal axis represents a gradation value in each histogram, and brightness become higher as the gradation value becomes larger. A vertical axis represents an occurrence count of the gradation value. FIG. 6A illustrates the averaging image number dependence of the gradation histogram. When the averaging image number is 2, 3, or 4, a noise component having vibrations similar to a trigonometric function, occurs in the histogram. The noise component becomes smaller as the averaging image number increases. The occurrence count becomes larger as the averaging image number increases.

FIG. 6B illustrates the gradation histogram after the Gaussian filter processing has been performed. Here, the σ value is 1.2. It can be seen that the Gaussian filter processing is performed so that the noise component dramatically decreases even in the histogram with a small averaging image number.

In FIGS. 6A and 6B, the gradation value at a peak having a gradation value of approximately 40, becomes smaller as the averaging image number increases. The gradation value at a peak having a gradation value of approximately 100 becomes larger as the averaging image number increases. Therefore, the gradation value difference between the peak having a gradation value of approximately 40 and the peak having a gradation value of approximately 100, becomes larger as the averaging image number increases. The gradation value difference between the peak having a gradation value of approximately 40 and the peak having a gradation value of approximately 100, corresponds to black-and-white amplitude of the image.

FIG. 6C illustrates σ value dependence of the gradation histogram after the Gaussian filter processing has been performed. Here, the averaging image number is 16. As the σ value increases, the gradation value at a peak having a gradation value of approximately 40 becomes larger and the gradation value at a peak having a gradation value of approximately 100 becomes smaller. Therefore, the σ value is varied based on the averaging image number and the black-and-white amplitude is adjusted so that the precision of comparing images can improve.

Particularly, the averaging image number of the reference image can increase in comparison to the averaging image number of the comparative images. Therefore, the Gaussian filter processing having a large σ value is particularly performed to the reference image so that noise can be dramatically reduced and black-and-white amplitude can be adjusted close to the original acquisition images. Thus, the reference image having good quality can be produced. Note that the σ value may be further appropriately adjusted based on the shape of the dies or the quantity of noise.

According to the inspection method of the present embodiment, an inspection method capable of further efficiently removing a noise component can be provided.

Fourth Embodiment

An inspection method according to the present embodiment is different from that according to the second embodiment in terms of acquiring a first additional addition image of an additional predetermined number of a first die; producing a first additional average image with a first common addition image, a second common addition image, a first individual addition image, and the first additional addition image; performing additional comparison between the first additional average image and a reference image; and predetermining whether a first defect of the first die is present, based on first comparison and the additional comparison. Here, the descriptions of points that duplicate with respect to the first to third embodiments will be omitted.

Figure 7:
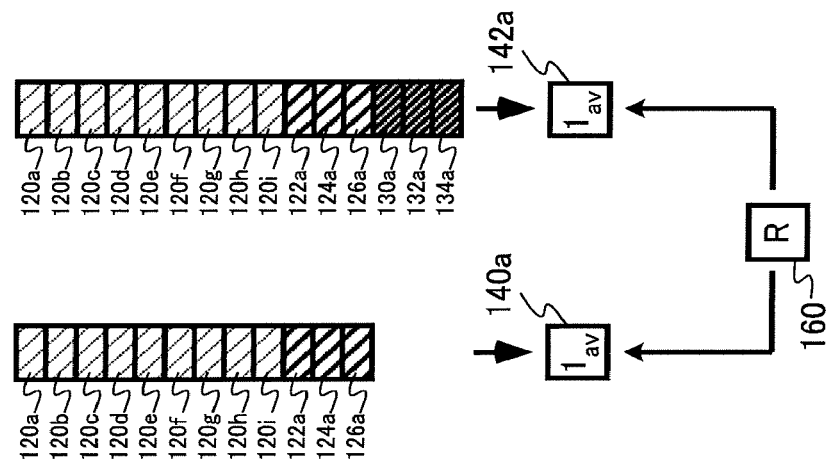
FIG. 7 is a schematic diagram of a part of an inspection method according to a fourth embodiment.
Figure 8:
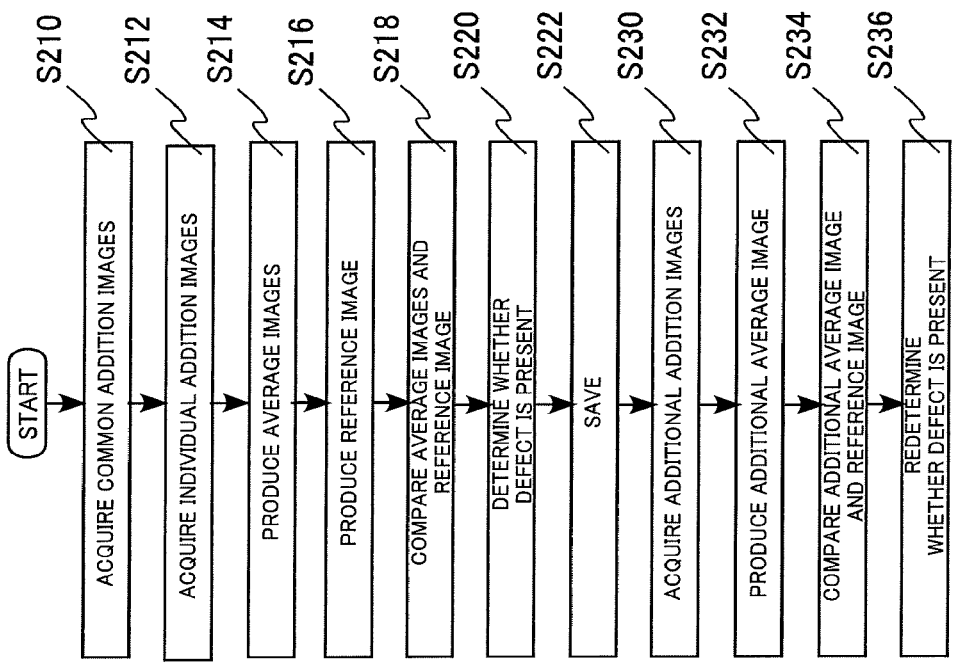
FIG. 8 is a flow chart of the inspection method according to the fourth embodiment.

FIG. 7 is a schematic diagram of the production of the additional average image, being a part of the inspection method according to the present embodiment. FIG. 8 is a flow chart of the inspection method according to the present embodiment.

When reinspection is performed to the first die 10a, a control calculator 1110 acquires the first additional addition images 130a, 132a, and 134a of the additional predetermined number of the first die 10a (S230). Note that the additional predetermined number is an integer of 1 or more. Here, the additional predetermined number is 3, but the additional predetermined number is not limited to this. Note that acquisition conditions of the additional addition images are preferably the same as acquisition conditions of the common addition images and the individual addition images, in order to simply perform production of an average image and filter processing.

Next, the control calculator 1110 produces the first additional average image 142a with the first common addition image 120a of a first predetermined number, the second common addition image 120b of the first predetermined number, a third common addition image 120c of the first predetermined number, a fourth common addition image 120d of the first predetermined number, a fifth common addition image 120e of the first predetermined number, a sixth common addition image 120f of the first predetermined number, a seventh common addition image 120g of the first predetermined number, an eighth common addition image 120h of the first predetermined number, a ninth common addition image 120i of the first predetermined number, the first individual addition images 122a, 124a, and 126a of a second predetermined number, and the first additional addition images 130a, 132a, and 134a of the additional predetermined number (S232 in FIG. 7).

Next, the control calculator 1110 performs the additional comparison between the first additional average image 142a and the reference image 160 (S234).

Next, the control calculator 1110 redetermined whether the first defect of the first die 10a is present, based on the first comparison and the additional comparison (S236). An exemplary specific redetermination method includes comparing a response value in the first comparison and a response value in the additional comparison for a position at which a defect is suspected to be present. Here, the response value is most simply the difference between the gradation value of the additional average image and the gradation value of the reference image. For example, the response value $K_{x,y}$ at coordinates (X, Y) is expressed with the gradation value $C_{x,y}$ of the additional average image and the gradation value $R_{x,y}$ of the reference image as follows:

$$K_{x,y}=|C_{x,y}-R_{x,y}|  \quad \text{[Mathematical Formula 1]}$$

Arithmetic processing is performed to a function $f_c$ and a function $f_R$ with the gradation value $C_{x,y}$ of the additional average image and the gradation value $R_{x,y}$ of the reference image each including gradation values around the coordinates (X, Y), respectively, and then the response value $K_{x,y}$ is expressed with the difference between results of the arithmetic processing, as follows:

$$K_{x,y}=|f_c(C_{x-n,y-n}, \ldots C_{x,y}, \ldots, C_{x+n,y+n})-f_R(R_{x-n,y-n}, \ldots R_{x,y}, \ldots, R_{x+n,y+n})| \quad \text{[Mathematical Formula 2]}$$

Note that the preferable comparison method is dependent on the classification of the defect. Therefore, a plurality of comparison methods may be used in parallel in response to the classification of the defect.

When the response value in the first comparison is larger than a predetermined threshold value for determining the defect and the response value in the additional comparison is larger than the predetermined threshold value, the position at which the defect is suspected to be present is determined to have the defect. Meanwhile, when the response value in the additional comparison is smaller than the predetermined threshold value or the response value in the additional comparison is smaller than the response value in the first comparison, the position at which the defect is suspected to be present can be determined not to have the defect.

Only the first comparison does not necessarily clarify whether the defect is present, due to noise. In this case, acquiring the additional addition images by the method according to the present embodiment and examining how the response value attributable to a noise component varies with and without the additional addition images are effective.

Note that similar to the common addition images or the individual addition images, instead of acquiring k additional addition images, when the amount of current necessary for the image acquisition is made to be k times by making the scanning speed of an electron beam 1/k, a noise reduction effect can be acquired even with one additional addition image, the noise reduction effect being similar to that in a case where the k additional addition images are acquired.

The scanning speed of the electron beam is made to be 1/k and then an image acquisition count increases so that the noise reduction can be further made.

According to the inspection method of the present embodiment, an inspection method capable of efficiently removing a noise component can be provided.

Fifth Embodiment

An inspection method according to the present embodiment is different from that according to the third embodiment in that a first additional addition image of a predetermined number is acquired before it is determined whether a first defect of a first die is present. Here, the descriptions of points that duplicate with respect to the first to fourth embodiment will be omitted.

Figure 9:
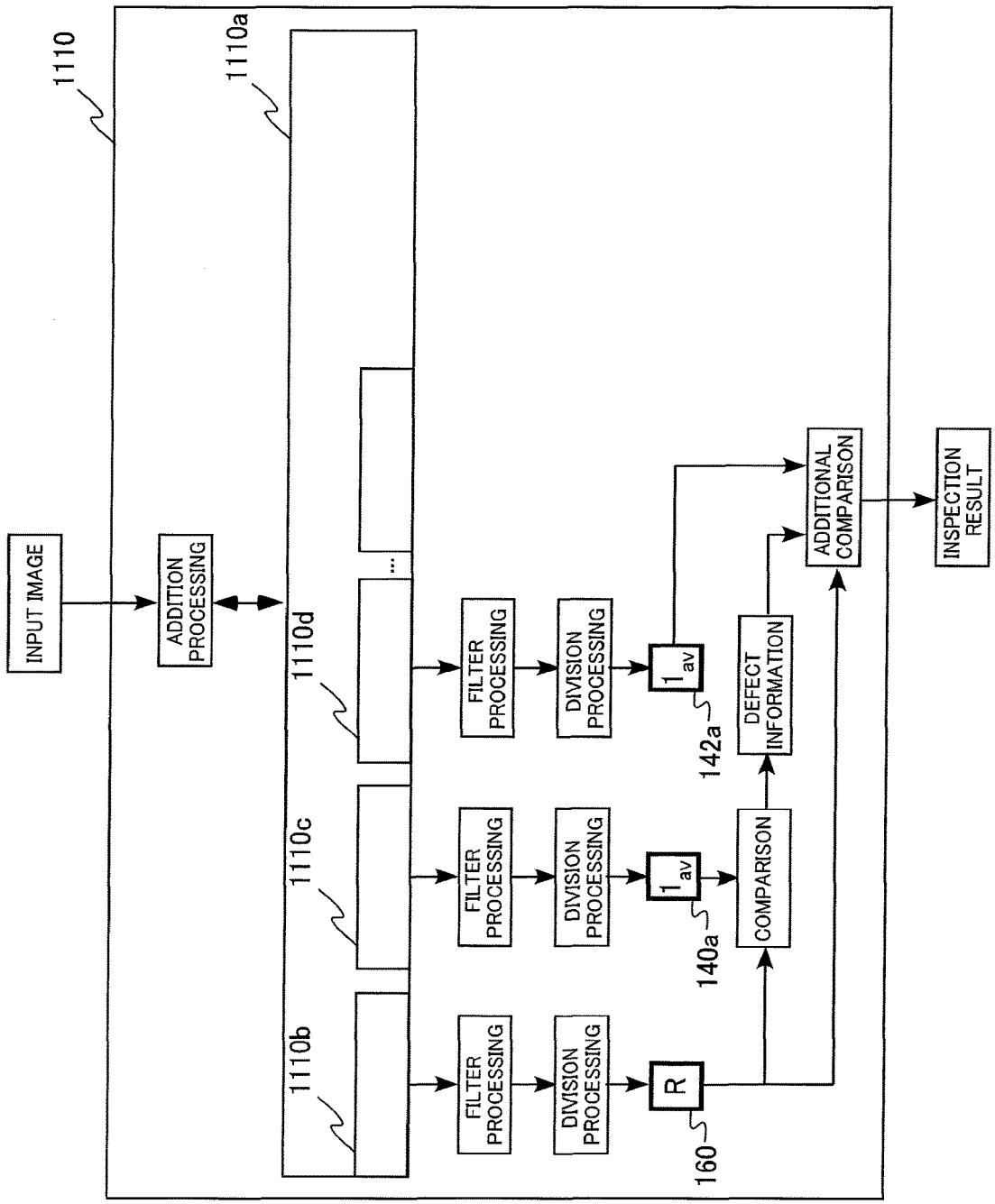
FIG. 9 is a schematic block diagram of a main unit of an inspection apparatus used for an inspection method according to a fifth embodiment.

FIG. 9 is a schematic block diagram of a main unit of an inspection apparatus used for the inspection method according to the present embodiment.

A control calculator 1110 includes an addition image memory 1110a. The addition image memory 1110a includes a memory area for a reference image 1110b, a memory area for a first average image 1110c, and a memory area for a first additional average image 1110d.

According to the present embodiment, a first common addition image of a first predetermined number, a first individual addition image of a second predetermined number, and the first additional addition image of the additional predetermined number, are acquired with a substrate 1101 fixed, on an XY stage 1105 in order to inspect the first die 10a. For a second die 10b, a second common addition image of the first predetermined number, a second individual addition image of the second predetermined number, and the first additional addition image of the additional predetermined number, are acquired with the substrate 1101 fixed, on the XY stage 1105 in order to inspect the second die 10b. Similar work is made for each die.

For preferable common addition images and individual addition images for producing a reference image 160, the control calculator 1110 adds and stores a gradation value at each position of each image, into the memory area for the reference image 1110b. The control calculator 1110 adds and stores a gradation value at each position of each image of preferable common addition images and individual addition images for producing a first average image 140a, into the memory area for the first average image 1110c. The control calculator 1110 adds and stores a gradation value at each position of each image of preferable common addition images, individual addition images, and additional addition images for producing a first additional average image 142a, into the memory area for the first additional average image 1110d. Similar processing is performed to the other dies.

Publicly known filter processing can be preferably used for any filter processing in FIG. 9. Gaussian filter processing to be described later is preferably used. The filter processing is performed with the gradation value added so that the performance count of the filter processing is advantageously smaller than that with no addition. Division processing includes dividing the gradation value by a different number based on the number of the images added.

First, first comparison between the first average image 140a and the reference image 160 is performed in determining whether the defect is present. When additional comparison is performed, the additional comparison can be performed with defect information acquired with the first comparison. Here, the defect information includes coordinates at which the defect is determined to be present with the first comparison, and the type of the defect, such as a white defect or a black defect.

According to the present embodiment, the first additional addition image 130a is acquired before determining whether the defect is present, so that the image acquisition can be performed with the movement count of the XY stage 1105, being reduced. Accordingly, the efficiency of the inspection can further improve.

Sixth Embodiment

An inspection method according to the present embodiment is different from that according to the fourth embodiment in that the sum of a first predetermined number, a second predetermined number, and an additional predetermined number is determined, based on a standard deviation of the gradation difference between two images selected from a first common addition image, a first individual addition image, and a first additional addition image, and a predetermined allowable error standard deviation. Here, the descriptions of points that duplicate with respect to the first to fifth embodiments will be omitted.

According to the present embodiment, two images are arbitrarily selected from the common addition image, the individual addition image, and the additional addition image acquired for a predetermined die. Next, the difference between gradation values (gradation difference) of the two images (two images), is calculated. The difference corresponds to a noise component included in the common addition image, the individual addition image, or the additional addition image. Meanwhile, the degree of requirements for the predetermined allowable error standard deviation is dependent on an algorithm used for evaluation.

An image acquisition count necessary for noise reduction, namely, the sum of the first predetermined number, the second predetermined number, and the additional predetermined number, can be preferably acquired, for example, by the following expression: (a standard deviation of the gradation difference between the two images/the predetermined allowable error standard deviation)^2 or (the standard deviation of the gradation difference between the two images/the predetermined allowable error standard deviation)$^2$ According to the inspection method of the present embodiment, image acquisition exceeding a preferable count for noise reduction, can be inhibited so that a noise component can be efficiently removed.

Seventh Embodiment

An inspection method according to the present embodiment is different from those according to the fourth embodiment and the sixth embodiment in that the sum of a first predetermined number, a second predetermined number, and an additional predetermined number, is determined based on a standard deviation of the gradation difference between one predetermined image selected from a first common addition image, a first individual addition image, and a first additional addition image, and a filtered predetermined image acquired by performing filter processing to the predetermined image, and a predetermined allowable error standard deviation. Here, the descriptions of points that duplicate with respect to the first to sixth embodiments will be omitted.

According to the present embodiment, one predetermined image is first arbitrarily selected from the common addition image, the individual addition image, and the additional addition image. Next, the filter processing is performed to the predetermined image so that the filtered predetermined image is acquired. Next, the sum of the first predetermined number, the second predetermined number, and the additional predetermined number is determined based on the standard deviation of the gradation value between the predetermined image and the filtered predetermined image and the predetermined allowable error standard deviation. The sum of the first predetermined number, the second predetermined number, and the additional predetermined number can be determined, for example, by the following expression: (the standard deviation of the gradation difference between the predetermined image and the filtered predetermined image/the predetermined allowable error standard deviation)^2 or (the standard deviation of the gradation difference between the predetermined image and the filtered predetermined image/the predetermined allowable error standard deviation)$^2$ Acquiring one predetermined image instead of acquiring two images, performing the filter processing to the predetermined image, and then removing noise can easily acquire the sum of the first predetermined number, the second predetermined number, and the additional predetermined number, in inspection requiring a long time for acquiring one image.

Median filter processing is preferable as the filter processing according to the present embodiment. In the median filter processing, gradation values are arranged in a local region in an n×n format, and a center value in the gradation values is made to be the gradation value of the center of the local region. The image moves within the local region in the median filter processing so that the median filter processing is suitable for high-frequency noise reduction in filter processing suitable for an inspection method of a pattern or a die. Therefore, according to the present embodiment, the median filter processing is used in order to acquire an image being a reference in noise component measurement.

According to the inspection method of the present embodiment, image acquisition exceeding a preferable count for noise reduction, can be inhibited so that a noise component can be efficiently removed.

As described above, a series of the "circuits", for example, the detection circuit 1106, the position circuit 1107, the comparative circuit 1108, the pattern generation circuit 1111, the reference circuit 1112, the average circuit 1113, the stage control circuit 1114, the comparative image production circuit 1115, the reference image production circuit 1116, the determination circuit 1119, the lens control circuit 1124, the blanking control circuit 1126, the deflection control circuit 1128, the individual distortion correction circuit 1140, the magnification distortion correction circuit 1142, the gradation correction circuit 1146, and the control system circuit 1160, includes at least one circuit, such as at least one electric circuit, as least one computer, at least one processor, at least one circuit board, or as least one semiconductor device, so as to be performed. The series of the "circuits" may include the same circuit or a group including the same circuits, in the at least one circuit. Alternatively, the series of the "circuits" may include a different circuit or a group including the different circuits, in the at least one circuit. Alternatively, a part of the series of the "circuits may include the same circuit or the group including the same circuits, in the at least one circuit, and the remains may include the different circuit or the group including the different circuits, in the at least one circuit. A program for executing the processor, is at least stored in a storage medium, such as a magnetic disk drive, a magnetic tape drive, an FD, or a read only memory (ROM). For example, the detection circuit 1106, the position circuit 1107, the comparative circuit 1108, the pattern generation circuit 1111, the reference circuit 1112, the average circuit 1113, the stage control circuit 1114, the comparative image production circuit 1115, the reference image production circuit 1116, the determination circuit 1119, the lens control circuit 1124, the blanking control circuit 1126, the deflection control circuit 1128, the individual distortion correction circuit 1140, the magnification distortion correction circuit 1142, the gradation correction circuit 1146, and the control system circuit 1160, individually include the at least one circuit. A series of the "memories" and the "memory areas", such as the addition image memory 1110a, the memory area for the reference image 1110b, the memory area for the first average image 1110c, the memory area for the first additional average image 1110d, the memory 1118, and the image memory 1123, includes, for example, a magnetic disk drive, a magnetic tape drive, or a flash memory.

The inspection method according to each embodiment can be preferably applied to an inspection method of acquiring an optical image by irradiating a substrate with a laser beam and capturing a transmitted image or a reflected image of the laser beam.

The embodiments have been described above with reference to the specific examples. However, the present disclosure is not limited to the specific examples.

Parts such as apparatus configurations and control methods, not directly necessary for the descriptions of the present disclosure, have been omitted, but a necessary apparatus configuration and control method can be appropriately selected and used.

According to the embodiments, parts such as configurations, not directly necessary for the descriptions of the present disclosure, have been omitted, but a necessary configuration can be appropriately selected and used. An inspection method including an element of the present disclosure, appropriately designed and altered by a person skilled in the art, is included in the scope of the present disclosure. The scope of the present disclosure is defined with the scope of the claims and the scope of equivalents of the claims.

What is claimed is:

1. An inspection method, comprising:
   acquiring a plurality of first acquisition images of a first die having a predetermined pattern;
   acquiring a plurality of second acquisition images of a second die having the predetermined pattern;
   acquiring a plurality of third acquisition images of a third die having the predetermined pattern;
   producing a first average image based on the first acquisition images;
   producing a second average image based on the second acquisition images;
   producing a third average image based on the third acquisition images;
   producing a first comparative image based on the first average image and the second average image;
   producing a second comparative image based on the second average image and the third average image;
   producing a third comparative image based on the first average image and the third average image;
   producing a reference image based on the first acquisition images, the second acquisition images, or the third acquisition images;
   performing first comparison between the first comparative image and the reference image;
   performing second comparison between the second comparative image and the reference image;
   performing third comparison between the third comparative image and the reference image,
   wherein each of the first comparison, the second comparison, and the third comparison are performed by comparing a pixel value at each position in the respective comparative image and a pixel value at each corresponding position in the reference image;
   determining, when a first defect is detected in the first comparison and the third comparison, that the first die has the first defect;
   determining, when a second defect is detected in the first comparison and the second comparison, that the second die has the second defect; and
   determining, when a third defect is detected in the second comparison and the third comparison, that the third die has the third defect.

2. The inspection method according to claim 1, further comprising:
   performing Gaussian filter processing having a sigma value based on an averaging image number, to the reference image, the first comparative image, the second comparative image, the third comparative image, the first average image, the second average image, or the third average image.

3. The inspection method according to claim 1, further comprising:
   determining, when the first defect is detected in the first comparison and the first defect is not detected in the third comparison or when the first defect is detected in the third comparison and the first defect is not detected in the first comparison, that the first defect is a first false defect;

determining, when the second defect is detected in the first comparison and the second defect is not detected in the second comparison or when the second defect is detected in the second comparison and the second defect is not detected in the first comparison, that the second defect is a second false defect; and determining, when the third defect is detected in the second comparison and the third defect is not detected in the third comparison or when the third defect is detected in the third comparison and the third defect is not detected in the second comparison, that the third defect is a third false defect.

4. The inspection method according to claim 3, further comprising:

determining, when the first defect is not detected in the first comparison and the third comparison, that the first die has no defect;

determining, when the second defect is not detected in the first comparison and the second comparison, that the second the has no defect; and determining, when the third defect is not detected in the second comparison and the third comparison, that the third die has no defect.

\* \* \* \* \*